(12) United States Patent
Hamm

(10) Patent No.: US 10,358,224 B2
(45) Date of Patent: Jul. 23, 2019

(54) PULSED ELECTROTHERMAL ICE PROTECTION SYSTEMS WITH COATED HEATING SUBSTRATES

(71) Applicant: Goodrich Corporation, Charlotte, NC (US)

(72) Inventor: Richard Roy Hamm, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 911 days.

(21) Appl. No.: 13/874,910

(22) Filed: May 1, 2013

(65) Prior Publication Data

US 2014/0326712 A1    Nov. 6, 2014

(51) Int. Cl.
*H05B 3/68* (2006.01)
*B60L 1/02* (2006.01)
*B64D 15/12* (2006.01)
*B64D 15/14* (2006.01)

(52) U.S. Cl.
CPC ............. *B64D 15/12* (2013.01); *B64D 15/14* (2013.01)

(58) Field of Classification Search
CPC ...... B64D 15/12; B64D 15/14; B64D 15/163; F25C 5/08
USPC .................. 219/202, 522, 443.1; 62/349–351
See application file for complete search history.

(56) References Cited

U.S. PATENT DOCUMENTS

| 5,143,325 A * | 9/1992 | Zieve et al. ............. 244/134 D |
| 7,703,300 B2 | 4/2010 | Petrenko |
| 8,752,279 B2 * | 6/2014 | Brittingham et al. .......... 29/611 |
| 2003/0155467 A1 | 8/2003 | Petrenko |

FOREIGN PATENT DOCUMENTS

| EP | 2383186 A2 | 11/2011 |
| WO | WO-2012159608 A2 | 11/2012 |

OTHER PUBLICATIONS

Search Report and Opinion isued by the European Patent Office dated Oct. 15, 2014 for European Patent Application No. 14166810.

* cited by examiner

*Primary Examiner* — Sang Y Paik
(74) *Attorney, Agent, or Firm* — Locke Lord LLP; Scott D. Wofsy; Joshua L. Jones

(57) ABSTRACT

An aircraft ice protection system includes a heating substrate with a coating in intimate thermal contact with the heating substrate. The thermal effusivities of the heating substrate and the coating are different from one another for interference of thermal waves reflected from the coating with thermal waves generated in the heating substrate. A pulse generator can be operatively connected to the heating substrate to convert pulsed electrical power from the pulse generator into thermal energy for ice removal or prevention.

19 Claims, 2 Drawing Sheets

PULSED ELECTROTHERMAL ICE PROTECTION SYSTEMS WITH COATED HEATING SUBSTRATES

BACKGROUND OF THE INVENTION

1. Field of the Invention

The present invention relates to ice removal or prevention, and more particularly to pulsed electrothermal de-icing and anti-icing systems such as for aircraft.

2. Description of Related Art

A variety of devices and methods are known for removing ice from structures such as aircraft components. Examples include electrical heating systems for melting ice from the surface of structures such as aircraft wings and propellers. Directly heating aircraft surfaces can require considerable electrical energy. One solution to this problem is pulse electrothermal de-icing, in which a power supply applies a high-power heating pulse to an interface between ice and the structure where ice must be removed, such as an aircraft wing. Pulse heating on the surface in this manner can melt a thin layer of the ice, and forces such as gravity or aerodynamic forces can then remove the ice layer from the surface. The combination of pulse electrothermal heating and aerodynamic or other forces can provide considerable power savings over traditional constant heating type systems. And since ice removed by pulse electrothermal de-icing tends to be removed in layers or chunks, there is considerably less ice-run back than in non-pulsed systems. Ice-run back refers to the phenomenon of ice melt refreezing in a new location on the surface, for example the unheated surface aft of a traditional heater in an aircraft wing.

Such conventional methods and systems have generally been considered satisfactory for their intended purpose. However, there is continuing need in the art for a de-icing that allows for improved thermal efficiency. There also remains a need in the art for such systems and methods that are easy to make and use. The present invention provides a solution for these problems.

SUMMARY OF THE INVENTION

The subject invention is directed to a new and useful ice protection system, such as for de-icing aircraft surfaces. The system includes a heating substrate with a coating in intimate physical and thermal contact with the heating substrate. The thermal effusivities of the heating substrate and the coating are different from one another for interference of thermal waves reflected from the coating with thermal waves generated in the heating substrate.

In certain embodiments, and a pulse generator is operatively connected to the heating substrate to convert pulsed electrical power from the pulse generator into thermal energy for ice removal or prevention of ice formation. The thermal effusivity of the coating can be greater than the thermal effusivity of the heating substrate for constructive interference of thermal waves reflected from the coating with thermal waves generated in the heating substrate to boost the peak temperature of the heating substrate and coating under pulsed electrical power from the pulse generator.

In accordance with certain embodiments, the heating substrate is metallic or composite, such as graphite for example. It is also contemplated that the coating can be a metallic film. The coating can be disposed on an ice side of the heating substrate where ice is melted when the system is in use. It is also contemplated that the coating can be disposed on a side of the heating substrate opposite to where ice is melted when the system is in use, or on all external surfaces of the heating substrate. The coating can have a thickness thinner than that of the heating substrate, on the order of about the thermal diffusion length of the thermal wave for example, the coating can have a thickness on the order of about one one-thousandth of that of the heating substrate.

It is contemplated that in certain embodiments the pulse generator includes a capacitor bank operatively connected to apply an electrical pulse to the heating substrate. The heating substrate can be operatively connected to the pulse generator as a self-heating resistive heater.

The invention also provides a method of protecting flight critical surfaces from in-flight ice hazards. The method includes applying an electrical pulse to a heating substrate to generate a thermal wave. The method also includes reflecting a portion of the thermal wave into the heating substrate from a coating on a surface of the substrate to interfere with the remaining portion of the applied thermal wave.

In certain embodiments, reflecting a portion of the thermal wave includes constructively interfering the reflected portion of the thermal wave with the thermal wave to boost the temperature of the substrate for ice removal or prevention. Applying an electrical pulse can include discharging a capacitor bank electrically coupled to the heating substrate, and can include heating the heating substrate through resistive heating during the pulse. The method can include melting ice from the side of the substrate having the coating and/or melting ice from a surface of the heating substrate opposite the coating. A capacitor bank can be repeatedly charged and discharged for an extended ice removal or prevention interval.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
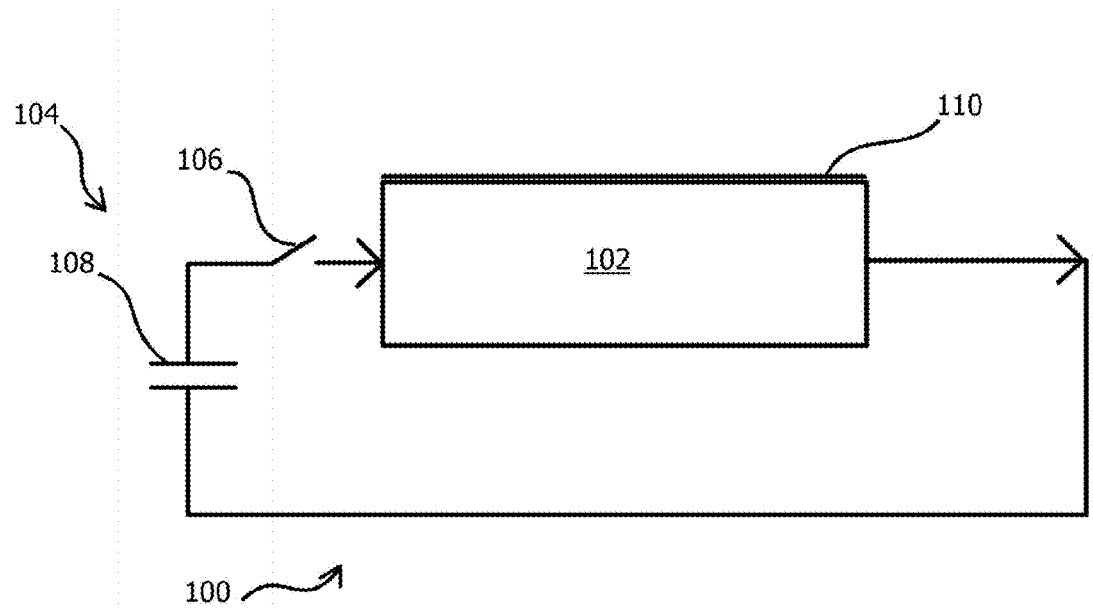
FIG. 1 is a schematic view of an exemplary embodiment of an ice protection system constructed in accordance with the present invention, showing a pulse generator, heating substrate, and coating on the heating substrate.

Reference will now be made to the drawings wherein like reference numerals identify similar structural features or aspects of the subject invention. For purposes of explanation and illustration, and not limitation, a partial view of an exemplary embodiment of an ice protection system in accordance with the invention is shown schematically in FIG. 1 and is designated generally by reference character 100.

Other embodiments of ice protection systems in accordance with the invention, or aspects thereof, are provided in FIGS. 2-3, as will be described. The systems and methods of the invention can be used for thermally efficient removal of ice or prevention of ice buildup, for example from aircraft surfaces.

Aircraft ice protection system 100 includes a heating substrate 102 and a pulse generator 104 operatively connected to heating substrate 102 to convert pulsed electrical power from pulse generator 104 into thermal energy for ice removal or prevention, for example by resistive heating in heating substrate 102. Pulse generator 104 includes a switching device 106 that selectively closes the circuit to discharge a capacitor bank 108 of pulse generator 104 into heating substrate 102. While schematically depicted as a simple switch, controller 106 can include control circuitry to connect capacitor bank 108 to heating substrate 102 for periodic pulsing. Capacitor bank 108 can therefore be repeatedly charged and discharged over an extended ice removal or prevention period. While depicted as a single capacitor, those skilled in the art will readily appreciate that capacitor bank 108 can include a single capacitor, multiple capacitors, or any other suitable device for storing and discharging energy. A coating 110 is coated in intimate thermal contact on the surface of heating substrate 102.

Figure 2:
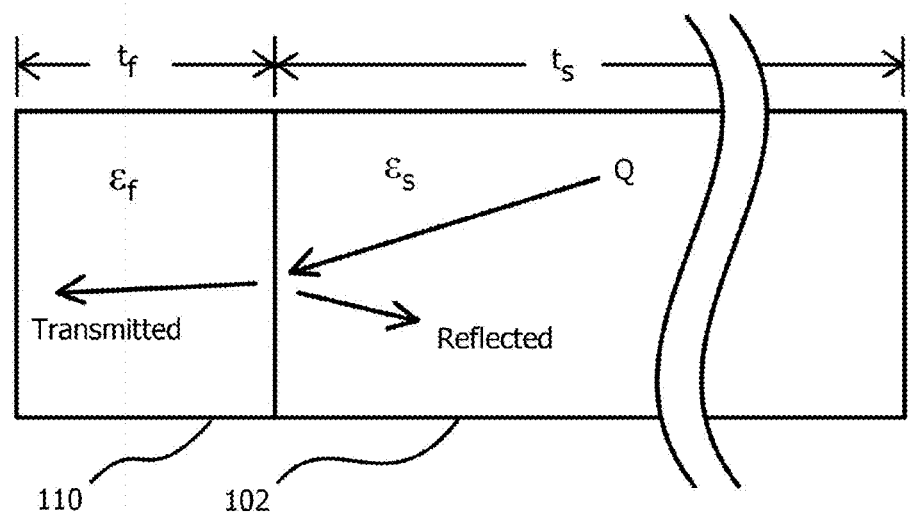
FIG. 2 is a schematic view of a portion of the system of FIG. 1, showing the reflection of a thermal wave by the coating.

With reference now to FIG. 2, the thermal effusivities of heating substrate 102 and coating 110 are different from one another for interference of thermal waves reflected from coating 110 with thermal waves generated in heating substrate 102. Thermal effusivity is a material property defined as the square root of the product of a material's thermal conductivity, density, and specific heat capacity. Thermal effusivity is a measure of a material's ability to exchange heat with the environment. Thermal effusivity is used, for example, to determine the temperature at the contact surface between two bodies initially at two different temperatures. The effusivities of coating 110 and heating substrate 102 are indicated as $\varepsilon_f$ and $\varepsilon_s$ in FIG. 2, respectively. Additionally, the respective thicknesses of coating 110 and heating substrate 102 are indicated as $t_f$ and $t_s$ in FIG. 2.

The relative effusivity values of the heating substrate 102 and coating 110, and the relative thickness of these two layers are configured to raise the pulse temperature compared to what the pulse temperature would be without coating 110. This increase in temperature represents an increase in thermal efficiency over what heater substrate 102 would have without a coating, since the temperature boost is attained without the need for increased electrical power. Heating substrate 102 is self-heated by the application of transient electrical discharges of energy from capacitor bank 108. The resulting transient heat pulse or wave, which is composed of wave functions generated by many point sources in heating substrate 102, forms a composite thermal wave which intersects with the interface of coating 110 and the thicker heating substrate 102, as indicated by the arrow labeled "Q" in FIG. 2.

The thermal wave is partially transmitted through the boundary into coating 110, as indicated by the arrow labeled "transmitted" in FIG. 2. Another portion of the wave is reflected back into the bulk of heating substrate 102 as indicated by the arrow labeled reflected in FIG. 2. Depending upon the effusivity values of coating 110 and heating substrate 102, the reflected portion of the thermal wave will interfere, e.g., constructively amplify or destructively attenuate, with the applied thermal wave in heating substrate 102. If the effusivity of coating 110 has value greater than that of heating substrate 102, then the peak temperature of the entire assembly can be greater than the peak temperature of heating substrate 102 without a coating. Conversely, the peak temperature of the entire assembly will be less than the peak temperature of the heating substrate 102 without a coating, if $\varepsilon_f$ is less than $\varepsilon_s$.

The process described above amplifies or attenuates the heat energy generated by the application of transient energy directly to the heating substrate or one layer of a multi-layer assembly, for example, depending on the values used for $\varepsilon_f$, $\varepsilon_s$, $t_f$, and $t_s$. The application of this method to aircraft electrothermal ice protection systems has the potential to reduce the amount of electrical power required from the aircraft while continuing to produce the same or added level of ice protection performance. The process may be applied to stored energy pulsed electrothermal ice protection systems. The application of effusivity engineered surfaces requires no additional electrical components and adds no significant weight to an aircraft platform. Additionally, aside from coating the heater element substrate material, the systems and techniques described herein can be applied without significantly impacting existing manufacturing practices. This process produces significantly higher peak temperatures which normally require higher peak currents and system voltages, thus producing a savings of weight and volume of system wiring and electrical components. Another potential benefit may be the use of film geometry and area coverage allowing localized concentration of heat amplification or attenuation in designs and applications requiring modulated heat distribution using the same transient heat pulse input.

Figure 3:
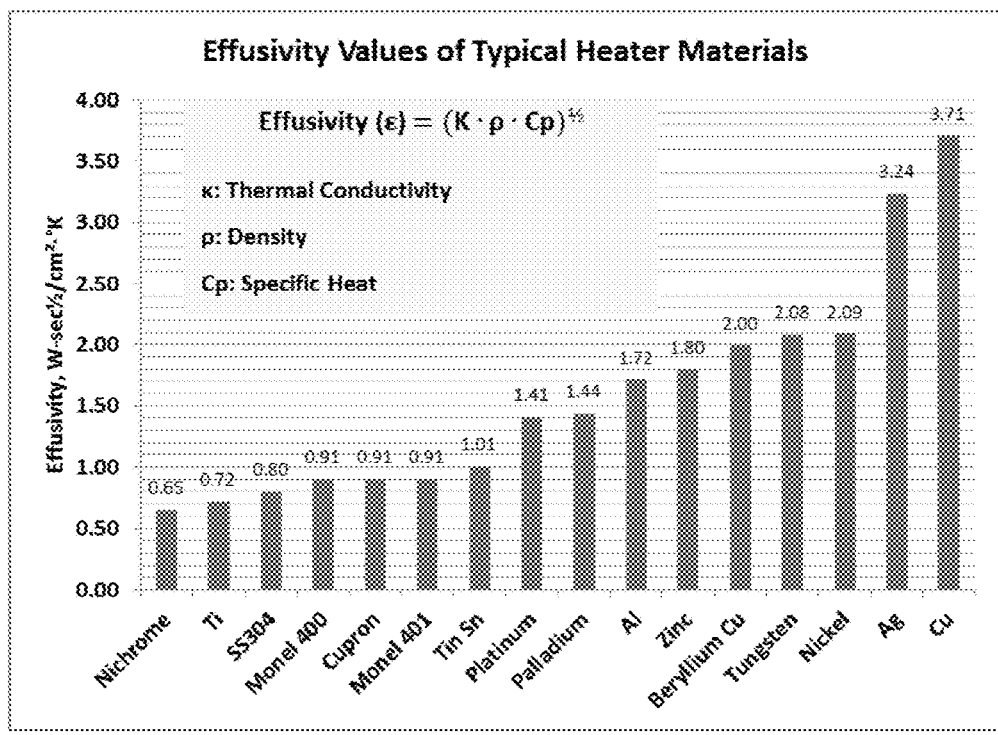
FIG. 3 is a graph showing effusivity values for typical heater materials.

With reference now to FIG. 3, ordered effusivity values of selected metals and alloys are shown. Generally, the greater the difference in effusivity between a heating substrate and a coating, the greater will be the degree of thermal wave reflectance. If effusivity of the coating is greater than that of the heating substrate, the interference of reflected thermal wave will be constructive with the thermal wave within the heating substrate, and vice versa. Any suitable materials for the coating and heating substrate can be selected as appropriate for specific applications. For example, a Titanium substrate with Copper coating on the order of a fraction of a micron thick will have a considerable temperature amplification by the effects described above compared to an uncoated Titanium substrate with the same power pulse applied. Alloys with a suitable effusivity value may not be appropriate for coating in all circumstances. For example, applying a copper coating to a Monel® alloy, available from the Special Metals Corporation of Huntington, W.V., which is principally made up of nearly equal portions of copper and nickel metals will not produce the expected thermal amplification. Despite the fact that Monel's effusivity is approximately 0.9 verses copper's effusivity of 3.71 the thermal amplification effect is countered by the substrate and coating containing like materials. It is also contemplated that composite materials such as graphite can be used in the substrate.

Physical Vapor Deposition (PVD) is a suitable coating process for applying the coating to a substrate including. Those skilled in the art will readily appreciate that any other suitable process for forming the coating can be used without departing from the scope of this disclosure.

Coating 110 can be disposed on an ice side of heating substrate 102 where ice is melted when the system is in use. However, the same temperature boost described above can be accomplished even if coating 110 is on the opposite side of heating substrate 102 from where the ice is to be removed. It is also contemplated that both or all sides of substrate 102 can have a coating 110. As shown in FIG. 2, coating 110 has a thickness thinner than that of heating substrate 102, for example, coating 110 can have a thickness on the order of about one one-thousandth of that of heating substrate 102. However, those skilled in the art will readily appreciate that the relative thicknesses and emissivities of coating 110 and heating substrate 102 can be tailored as needed for any given application. There are additional technical considerations for determining coating thickness in addition to empirically derived estimates. The optimum thickness of the coating 110 will be dependent on the thermal diffusion length of the thermal wave which is defined as the distance at which the propagated wave amplitude decays times its initial value. The coating 110 thickness should be on the order of the thermal diffusion length of the thermal wave. The temporal parameters of the electrical pulse applied to the substrate 102 can be used as a basis for an initial estimate of the thermal diffusion length calculation.

The methods and systems of the present invention, as described above and shown in the drawings, provide for de-icing with superior properties including increased thermal efficiency. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An aircraft ice protection system comprising:
a heating substrate; and
a coating in intimate physical and thermal contact with the heating substrate, wherein the thermal effusivity of the coating is greater than that of the heating substrate for interference of thermal waves reflected from the coating with thermal waves generated in the heating substrate, wherein the coating is on the order of a fraction of a micron thick.

2. An aircraft ice protection system as recited in claim 1, further comprising a pulse generator operatively connected to the heating substrate to convert pulsed electrical power from the pulse generator into thermal energy for ice removal or prevention of ice formation.

3. An aircraft ice protection system as recited in claim 2, wherein the thermal effusivity of the coating is greater than the thermal effusivity of the heating substrate for constructive interference of thermal waves reflected from the coating with thermal waves generated in the heating substrate to boost the peak temperature of the heating substrate and coating under pulsed electrical power from the pulse generator.

4. An aircraft ice protection system as recited in claim 2, wherein the heating substrate is operatively connected to the pulse generator as a resistive heater.

5. An aircraft ice protection system as recited in claim 2, wherein the pulse generator includes a capacitor bank operatively connected to apply an electrical pulse to the heating substrate.

6. An aircraft ice protection system as recited in claim 1, wherein the heating substrate is metallic or composite.

7. An aircraft ice protection system as recited in claim 1, wherein the coating is a metallic film.

8. An aircraft ice protection system as recited in claim 1, wherein the coating is disposed on an ice side of the heating substrate where ice is melted when the system is in use.

9. An aircraft ice protection system as recited in claim 1, wherein the coating is disposed on a side of the heating substrate opposite to where ice is melted when the system is in use.

10. An aircraft ice protection system as recited in claim 1, wherein the coating has a thickness thinner than that of the heating substrate.

11. An aircraft ice protection system as recited in claim 1, wherein the coating has a thickness on the order of about the thermal diffusion length of the thermal wave.

12. A method of ice protecting a surface comprising:
applying an electrical pulse to a heating substrate to generate a thermal wave; and
reflecting a portion of the thermal wave into the heating substrate from a coating on a surface of the substrate to interfere the reflected portion with the thermal wave, wherein the thermal effusivity of the coating is greater than that of the heating substrate, and wherein the coating is on the order of a fraction of a micron thick.

13. A method as recited in claim 12, wherein reflecting a portion of the thermal wave includes constructively interfering the reflected portion of the thermal wave with the thermal wave to boost the temperature of the substrate for ice removal.

14. A method as recited in claim 12, wherein applying an electrical pulse includes heating the heating substrate through resistive heating during a pulse from an electrical pulse generator.

15. A method as recited in claim 12, wherein reflecting a portion of the thermal wave includes reflecting a thermal wave wherein the substrate is metallic or a conductive composite material, and wherein the coating is a metallic film with an effusivity greater than that of the heating substrate.

16. A method as recited in claim 12, further comprising melting ice from a side of the heating substrate having the coating thereon.

17. A method as recited in claim 12, further comprising melting ice from a side of the heating substrate opposite the coating.

18. A method as recited in claim 12, wherein applying an electrical pulse includes discharging stored energy in a capacitor bank electrically coupled to the heating substrate.

19. A method as recited in claim 18, wherein the step of discharging the stored energy in a capacitor bank is repeated periodically for an extended ice removal interval.

* * * * *